United States Patent Office 3,787,535
Patented Jan. 22, 1974

3,787,535
O-ALKYL(ALKENYL)-N-MONOALKYL(ALKENYL)-
S - [N' - MONOALKYL (ALKENYL)-CARBAMYL-
METHYL] - THIONOTHIOLPHOSPHORIC ACID
ESTER AMIDES
Claus Stölzer, Wuppertal-Vohwinkel, Ingeborg Hammann, Cologne, and Günter Unterstenhofer and Bernhard Homeyer, Opladen, Germany, assignors to Bayer Aktiengesellschaft, Leverkusen, Germany
No Drawing. Filed July 8, 1971, Ser. No. 160,963
Claims priority, application Germany, July 11, 1970,
P 20 34 482.5
Int. Cl. A01n 9/36; C07f 9/24
U.S. Cl. 260—943                                                    9 Claims

ABSTRACT OF THE DISCLOSURE

O-alkyl(alkenyl)-N-monoalkyl(alkenyl)-S-[N' - monoalkyl(alkenyl) - carbamylmethyl] - thionothiolphosphoric acid ester amides of the general formula

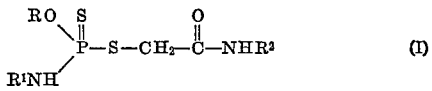

in which

R and $R^2$ each is an alkyl or alkenyl radical with up to 6 carbon atoms, and
$R^1$ is a methyl, ethyl, isopropyl or an alkenyl radical with up to 4 carbon atoms, which possess nematocidal, insecticidal and acaricidal properties.

---

The present invention relates to and has for its objects the provision of particular new O-alkyl(alkenyl)-N-monoalkyl(alkenyl) - S - [N' - monoalkyl(alkenyl)-carbamylmethyl]-thionothiolphosphoric acid ester amides, which possess nematocidal, insecticidal and acaricidal properties, active compositions in the form of mixtures of such compounds with solid and liquid dispersible carrier vehicles, and methods for producing such compounds and for using such compounds in a new way especially for combating pests, e.g. nematodes, insects and acarids, with other and further objects becoming apparent from a study of the within specification and accompanying examples.

It is known from U.S.S.R. patent specification 183,205 and U.S. patent specification 3,007,845 that O-alkyl-N,N-dialkyl - S - (N'-monoalkyl-carbamylmethyl)-thionothiolphosphoric acid ester amides, for example O-ethyl-N,N-dimethyl - S - (N'-methylcarbamylmethyl)-thionothiolphosphoric acid ester amide (Compound A), and O,O-dialkyl-S-(N - methylcarbamylmethyl)-thiolphosphoric acid esters, for example O,O-dimethyl-S-(N-methylcarbamylmethyl)-thiolphosphoric acid ester (Compound B), exhibit a pesticidal, in particular insecticidal, acaricidal and nematocidal, activity. Furthermore, it is known from Japanese published patent application 15,800/69 that certain O-alkyl-N-monoalkyl-S-(N'-monoalkylcarbamylmethyl)-thionothiolphosphoric acid ester amides, namely those with an n-propyl or a higher alkyl radical attached to the nitrogen bonded directly to the phosphorus atom, for example O-ethyl-N-mono-n-propyl-S-(N'-methylcarbamylmethyl)-thionothiolphosphoric acid ester amide (Compound C), show an insecticidal effectiveness.

The present invention provides, as new compounds, the O-alkyl(alkenyl)-N-monoalkyl(alkenyl)-S-[N'-monoalkyl(alkenyl) - carbamylmethyl] - thionothiolphosphoric acid amides of the general formula:

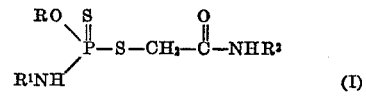

in which

R and $R^2$ each is an alkyl or alkenyl radical with up to 6 carbon atoms, and
$R^1$ is a methyl, ethyl, isopropyl or an alkenyl radical with up to 4 carbon atoms.

These new compounds have been found to possess strong nematocidal, insecticidal and acaricidal properties.

The present invention also provides a process for the preparation of a compound of the Formula I in which an O - alkyl(alkenyl)-N-monoalkyl(alkenyl)-thionothiolphosphoric acid ester amide of the general formula:

in which

R and $R^1$ have the meanings stated above, and
M stands for an alkali metal equivalent, an alkaline earth metal equivalent or an optionally alkyl-substituted ammonium equivalent, is reacted with a haloacetic acid amide of the general formula:

in which $R^2$ has the meaning stated above, and
Hal stands for a halogen atom, preferably a chlorine or bromine atom.

Surprisingly, the new O-alkyl(alkenyl)-N-monoalkyl-(alkenyl)-S-[N' - monoalkyl(alkenyl)carbamylmethyl)-thionothiolphosphoric acid ester amides of the Formula I show a remarkably better nematocidal, insecticidal and acaricidal activity than the O-alkyl-N,N-dialkyl- or N-monoalkyl-S-(N' - monoalkylcarbamylmethyl) - thionothiolphosphoric acid ester amides and O,O-dialkyl-S-(N-methylcarbamylmethyl) thiolphosphoric acid ester known from the prior art which are chemically the most closely comparable compounds of the same type of activity. The nematocidal activity of the compounds of the invention, which is surprising in comparison with the prior art compounds, is especially noteworthy. Their toxicity to warm blooded animals is also lower than structurally similar prior art compounds. The compounds of this invention therefore are a genuine enrichment of the art.

If, by way of an example, the sodium salt of O-ethyl-N - monomethyl-thionothiolphosphoric acid ester amide and bromoacetic acid monomethyl amide are used as starting materials in the preparative process of this invention, the reaction may be represented by the following equation:

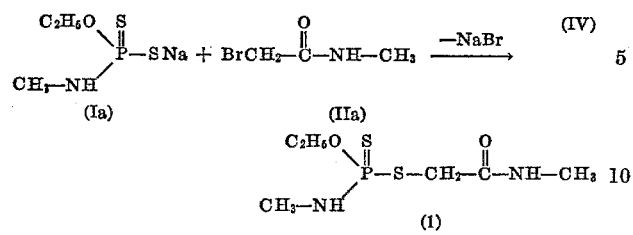

Preferably, R and R² each stands for a straight-chain or branched alkyl radical with 1–4 carbon atoms (namely methyl, ethyl, n- or isopropyl or n-, iso-, sec.- or tert.-butyl) or allyl; it is especially preferred that R² should stand for methyl, isopropyl or allyl. Preferably, R¹ stands for methyl, ethyl, isopropyl or allyl.

As examples of the starting materials of the Formula II, there may be mentioned the sodium, potassium and ammonium salts of O-methyl-N-methyl-, O-methyl-N-ethyl-, O-methyl-N-isopropyl-, O-ethyl-N-methyl-, O-ethyl-N-ethyl-, O-ethyl-N-isopropyl-, O-n-propyl-N-methyl-, O-n-propyl-N-ethyl-, O-n-propyl-N-isopropyl-, O-isopropyl-N-methyl-, O-isopropyl-N-ethyl-, O-isopropyl-N-isopropyl-O-n-butyl-N-methyl-, O-n-butyl-N-ethyl-, O-n-butyl-N-isopropyl- and O-isobutyl-N-isopropyl-thionothiolphosphoric acid ester amides.

The preparative process is preferably effected using a solvent or diluent, for which purpose all inert organic solvents and diluents are suitable, especially aliphatic and aromatic optionally chlorinated hydrocarbons, such as toluene, benzene, xylenes, benzine, methylene chloride, chloroform, carbon tetrachloride and chlorobenzene; ethers, such as diethyl ether, dibutyl ether and dioxane; ketones, such as acetone and methylethyl, methylisopropyl and methylisobutyl ketones; nitriles, such as acetonitrile; and alcohols, such as methanol and ethanol. In some cases water is also suitable as the reaction medium.

The reaction temperatures can be varied within a fairly wide range. In general the reaction is effected at about 0° to 100° C., preferably about 20° to 40° C. The reaction is, in general, effected at normal pressure.

When carrying out the preparative process, the salts of the Formula II and the haloacetic acid amides are in most cases used in equimolar amounts. An excess of one or the other of the reactants brings no substantial advantages. Preferably, the reaction takes place in one of the above-mentioned solvents at about 20° to 40° C.

The reaction solution is, in most cases, stirred afterwards for some hours, and is then worked up according to customary methods.

The compounds according to the invention are obtained in most cases in the form of colorless to slightly yellow-colored, viscous, water-insoluble oils which cannot be distilled without decomposition but which can, however, by so-called "slight distillation," that is by longer heating to moderately elevated temperatures under reduced pressure, be freed from the last volatile components and in this way be purified. For this characterization, the refractive index is especially suitable.

The compounds obtained in crystalline form are characterized by their melting points.

As already mentioned, the new compounds according to the invention are distinguished by outstanding nematocidal, insecticidal and acaricidal properties. They possess a good effectiveness against both sucking and biting insects, Diptera, mites, as well as a systemic activity. The products may therefore be used with success in crop protection and the protection of stored products, as well as in the hygiene field, against the most diverse animal pests.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the red bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamon-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germancia*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprises essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hermitarsonemus latus*) and the cyclamen mite (*Tarsonemus pallidus*); finally, ticks such as the relapsing fever tick (*Ornithodorus moubata*); and the like.

When applied against pests harmful to health and pests of stored products, especially flies and mosquitoes, the active compounds are also distinguished by an outstanding residual activity on wood and clay, as well as a good stability to alkali on limed substrates.

The active compounds according to the instant invention can be utilized, if desired, in the form of the usual formulations or composition with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrate, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents.

The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and nematocides, or fungicides, bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.005–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. nematodes, insects and acarids and more particularly methods of combating at least one of nematodes, insects and acarids which comprises applying to at least one of correspondingly (a) such nematodes, (b) such insects, (c) such acarids, and (d) the corresponding habitat thereof, i.e. the locus to be protected, a correspondingly combative or toxic amount, i.e. a nematocidally, insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1:

TABLE 1
Myzus test

| Active compounds | Concentration of active compound in percent | Degree of destruction in percent after 1 day |
|---|---|---|
| (A) $(C_2H_5O)(({CH_3})_2N)P(=S)-S-CH_2-C(=N)-NH-CH_3$ (known) | 0.1 / 0.01 / 0.001 | 100 / 90 / 0 |
| (D) $(C_2H_5O)(C_4H_9-NH)P(=S)-S-CH_2-C(=O)-NH-CH_3$ (known) | 0.1 / 0.01 / 0.001 | 100 / 80 / 0 |
| (1) $(C_2H_5O)(CH_3-NH)P(=S)-S-CH_2-C(=O)-NH-CH_3$ | 0.1 / 0.01 / 0.001 | 100 / 100 / 90 |
| (2) $(C_2H_5O)(CH_3-NH)P(=S)-S-CH_2-C(=O)-NH-C_3H_7-i$ | 0.1 / 0.01 / 0.001 | 100 / 99 / 55 |
| (3) $(C_2H_5O)(C_2H_5-NH)P(=S)-S-CH_2-C(=O)-NH-CH_3$ | 0.1 / 0.01 / 0.001 | 100 / 100 / 90 |
| (4) $(CH_3O)(i\text{-}C_3H_7-NH)P(=S)-S-CH_2-C(=O)-NH-CH_3$ | 0.1 / 0.01 / 0.001 | 100 / 100 / 20 |
| (5) $(C_2H_5O)(i\text{-}C_3H_7NH)P(=S)-S-CH_2-C(=O)-NH-CH_3$ | 0.1 / 0.01 / 0.001 | 100 / 100 / 90 |
| (6) $(C_2H_5O)(i\text{-}C_3H_7-NH)P(=S)-S-CH_2-C(=O)-NH-C_3H_7\text{-}i$ | 0.1 / 0.01 / 0.001 | 100 / 99 / 45 |

EXAMPLE 2

Doralis test (systemic action)

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

The active compounds, the concentrations of the active compounds, the evaluation time and the results can be seen from the following Table 2.

TABLE 2
Doralis test/systemic action

| Active compounds | Concentration of active compound in percent | Degree of destruction in percent after 4 days |
|---|---|---|
| (C) $(C_2H_5O)(n\text{-}C_3H_7-NH)P(=S)-S-CH_2-C(=O)-NH-CH_3$ (known) | 0.1 / 0.01 | 1.0 / 20 |
| (D) $(C_2H_5O)(C_4H_9-NH)P(=S)-S-CH_2-C(=O)-NH-CH_3$ (known) | 0.1 / 0.01 | 50 / 0 |

TABLE II—Continued
Doralis test/systemic action

| Active compounds | Concentration of active compound in percent | Degree of destruction in percent after 4 days |
|---|---|---|
| (1) $\begin{array}{c}C_2H_5O\\ \diagdown\\ CH_3-NH\end{array}\!\!\!\overset{S}{\underset{\|}{P}}\!\!\!-S-CH_2-\overset{O}{\underset{\|}{C}}-NH-CH_3$ | 0.1<br>0.01<br>0.001 | 100<br>100<br>100 |
| (2) $\begin{array}{c}C_2H_5O\\ \diagdown\\ CH_3-NH\end{array}\!\!\!\overset{S}{\underset{\|}{P}}\!\!\!-S-CH_2-\overset{O}{\underset{\|}{C}}-NH-C_3H_7\text{-}i$ | 0.1<br>0.01<br>0.001<br>0.0001 | 100<br>100<br>100<br>95 |
| (3) $\begin{array}{c}C_2H_5O\\ \diagdown\\ C_2H_5-NH\end{array}\!\!\!\overset{S}{\underset{\|}{P}}\!\!\!-S-CH_2-\overset{O}{\underset{\|}{C}}-NH-CH_3$ | 0.1<br>0.01 | 100<br>100 |
| (4) $\begin{array}{c}CH_3O\\ \diagdown\\ i\text{-}C_3H_7-NH\end{array}\!\!\!\overset{S}{\underset{\|}{P}}\!\!\!-S-CH_2-\overset{O}{\underset{\|}{C}}-NH-CH_3$ | 0.1<br>0.01 | 100<br>100 |
| (5) $\begin{array}{c}C_2H_5O\\ \diagdown\\ i\text{-}C_3H_7NH\end{array}\!\!\!\overset{S}{\underset{\|}{P}}\!\!\!-S-CH_2-\overset{O}{\underset{\|}{C}}-NH-CH_3$ | 0.1<br>0.01 | 100<br>100 |
| (6) $\begin{array}{c}C_2H_5O\\ \diagdown\\ i\text{-}C_3H_7-NH\end{array}\!\!\!\overset{S}{\underset{\|}{P}}\!\!\!-S-CH_2-\overset{O}{\underset{\|}{C}}-NH-C_3H_7\text{-}i$ | 0.1<br>0.01 | 100<br>60 |
| (7) $\begin{array}{c}CH_3O\\ \diagdown\\ CH_3-NH\end{array}\!\!\!\overset{S}{\underset{\|}{P}}\!\!\!-S-CH_2-\overset{O}{\underset{\|}{C}}-NH-CH_3$ | 0.1<br>0.01<br>0.001 | 100<br>100<br>95 |

EXAMPLE 3

Tetranychus test

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are skilled whereas 0% means that none of the spider mites are killed.

The active compounds, the concentrations of the active compounds, the evaluation times and the results can be seen from Table 3.

TABLE 3
Tetranychus test

| Active compounds | Concentration of active compound in percent | Degree of destruction in percent after 2 days |
|---|---|---|
| (A) $(CH_3)_2N-\overset{S}{\underset{\|}{\overset{\|}{P}}}(OC_2H_5)-S-CH_2-\overset{O}{\underset{\|}{C}}-NH-CH_3$ (known) | 0.1 | 30 |
| (C) $\begin{array}{c}C_2H_5O\\ \diagdown\\ n\text{-}C_3H_7-NH\end{array}\!\!\!\overset{S}{\underset{\|}{P}}\!\!\!-S-CH_2-\overset{O}{\underset{\|}{C}}-NH-CH_3$ (known) | 0.1 | 10 |
| (D) $\begin{array}{c}C_2H_5O\\ \diagdown\\ C_4H_9-NH\end{array}\!\!\!\overset{S}{\underset{\|}{P}}\!\!\!-S-CH_2-\overset{O}{\underset{\|}{C}}-NH-CH_3$ (known) | 0.1 | 30 |
| (1) $\begin{array}{c}C_2H_5O\\ \diagdown\\ CH_3-NH\end{array}\!\!\!\overset{S}{\underset{\|}{P}}\!\!\!-S-CH_2-\overset{O}{\underset{\|}{C}}-NH-CH_3$ | 0.1 | 80 |

TABLE 3—Continued

| Active compounds | Concentration of active compound in percent | Degree of destruction in percent after 2 days |
|---|---|---|
| (3) $C_2H_5O$-, $C_2H_5$-NH- \P(=S)-S-$CH_2$-C(=O)-NH-$CH_3$ | 0.1 | 65 |
| (4) $CH_3O$-, i-$C_3H_7$-NH- \P(=S)-S-$CH_2$-C(=O)-NH-$CH_3$ | 0.1 | 80 |
| (6) $C_2H_5O$-, i-$C_3H_7$-NH- \P(=S)-S-$CH_2$-C(=O)-NH-$C_3H_7$-i | 0.1 | 98 |
| (8) n-$C_3H_7O$-, i-$C_3H_7$-NH- \P(=S)-S-$CH_2$-C(=O)-NH-$CH_3$ | 0.1 | 98 |
| (9) $C_2H_5O$-, i-$C_3H_7$-NH- \P(=S)-S-$CH_2$-C(=O)-NH-$CH_2$-CH=$CH_2$ | 0.1 | 75 |

EXAMPLE 4

Critical concentration test

Treat nematode: *Meloidogyne incognita*.
Solvent: 3 parts by weight acetone.
Emulsifier: 1 part by weight alkylaryl polyglycol ether.

To produce a suitable preparation of the particular active compound, 1 part by weight of such active compound is mixed with the stated amount of solvent, the stated amount of emulsifier is added thereto, and the resulting concentrate is diluted with water to the desired final concentration.

The preparation of the given active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of effectiveness of the given active compound is determined as a percentage. The degree of effectiveness is 100% when infestation is completely avoided; it is 0% when the infestation is exactly the same as in the case of the control plants in untreated soil which has been infested in the same manner.

The particular active compounds tested, the amounts applied and the results obtained can be seen from the following Table 4:

TABLE 4

Nematocides/meloidogyne incognita

| Active compound | Degree of destruction of active compound in percent with concentration of | | | | | | |
|---|---|---|---|---|---|---|---|
| | 50 p.p.m. | 40 p.p.m. | 20 p.p.m. | 10 p.p.m. | 5 p.p.m. | 2.5 p.p.m. | 1.25 p.p.m. |
| (1) $C_2H_5O$-, $CH_3$-NH- \P(=S)-S-$CH_2$-C(=O)-NH-$CH_3$ | 100 | 98 | 98 | 95 | | | |
| (5) i$C_3H_7$NH-, $C_2H_5O$- \P(=S)-S-$CH_2$-C(=O)-NH-$CH_3$ | 100 | 100 | 100 | 99 | 99 | 98 | 40 |
| (4) $CH_3O$-, i$C_3H_7$-NH- \P(=S)-S $CH_2$-C(=O)-NH-$CH_3$ | 100 | 100 | 100 | 100 | 99 | 90 | |
| (6) $C_2H_5O$-, i$C_3H_7$-NH- \P(=S)-S-$CH_2$-C(=O)-NH-$C_3H_7$i | 100 | 100 | 100 | 100 | 99 | 96 | 75 |
| (2) $C_2H_5O$-, $CH_3$-NH- \P(=S)-S-$CH_2$-C(=O)-NH-$C_3H_7$i | 100 | 100 | 100 | 98 | 90 | 50 | |
| (3) $C_2H_5O$-, $C_2H_5$-NH- \P(=S) S $CH_2$-C(=O)-NH-$CH_3$ | 100 | 100 | 100 | 100 | 98 | 50 | |

TABLE 4—Continued

Nematocides/meloidogyne incognita

| Active compound | Degree of destruction of active compound in percent with concentration of | | | | | | |
|---|---|---|---|---|---|---|---|
| | 50 p.p.m. | 40 p.p.m. | 20 p.p.m. | 10 p.p.m. | 5 p.p.m. | 2.5 p.p.m. | 1.25 p.p.m. |
| (A) $\begin{array}{c}C_2H_5O\\ \diagdown\\ (CH_3)_2N\end{array}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$ P—S—CH$_2$—C(=O)—NH—CH$_3$  (known) | 100 | 98 | 25 | 0 | | | |
| (D) C$_2$H$_5$O, C$_4$H$_9$—NH — P(=S)—S—CH$_2$—C(=O)—NH—CH$_3$ (known) | 0 | | | | | | |
| (C) C$_2$H$_5$O, n-C$_3$H$_7$—NH — P(=S)—S—CH$_2$—C(=O)—NH—CH$_3$ (known) | 0 | | | | | | |
| (B) CH$_3$O, CH$_3$O — P(=O)—S—CH$_2$—CO—NH—CH$_3$ (known) | 0 | | | | | | |

The following preparative example illustrates the process of the invention.

EXAMPLE 5

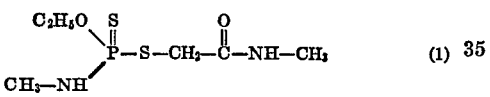

To 212.5 g. (1.1 moles) of the sodium salt of O-ethyl-N-monomethylthionothiolphosphoric acid ester amide in 600 cc. of acetonitrile there are added slowly, at room temperature, 152.0 g. (1.0 mole) of bromoacetic acid monomethyl amide in 200 cc. of acetonitrile. The mixture is afterwards stirred overnight at room temperature; it is poured into water; taken up in benzene; the organic phase is washed neutral with water; it is dried over sodium sulfate; filtered; the filtrate is concentrated and recrystallization from benzene-petroleum ether is effected. 182.0 g. (75% of theory) of O-ethyl-N-monomethyl - S - (N'-methylcarbamylmethyl)-thionothiolphosphoric acid ester amide are obtained as a yellowish crystalline product of the melting point 55° C. At 40° C. the reaction proceeds in shorter time.

Analogously, the following compounds are prepared:

| | Constitution | Physical properties |
|---|---|---|
| (3) | C$_2$H$_5$O, C$_2$H$_5$—NH — P(=S)—S—CH$_2$—C(=O)—NH—CH$_3$ | M.P. 49° C. |
| (5) | C$_2$H$_5$O, iC$_3$H$_7$—NH — P(=S)—S—CH$_2$—C(=O)—NH—CH$_3$ | $n_D^{23}$ 1.5414 |
| (7) | CH$_3$O, CH$_3$—NH — P(=S)—S—CH$_2$—C(=O)—NH—CH$_3$ | $n_D^{19.5}$ 1.5708 |
| (4) | CH$_3$O, iC$_3$H$_7$—NH — P(=S)—S—CH$_2$—C(=O)—NH—CH$_3$ | $n_D^{23.5}$ 1.5481 |
| (8) | nC$_3$H$_7$O, iC$_3$H$_7$—NH — P(=S)—S—CH$_2$—C(=O)—NH—CH$_3$ | $n_D^{28}$ 1.5324 |
| (10) | iC$_3$H$_7$O, CH$_3$—NH — P(=S)—S—CH$_2$—C(=O)—NH—CH$_3$ | $n_D^{20.5}$ 1.5448 |
| (2) | C$_2$H$_5$O, CH$_3$—NH — P(=S)—S—CH$_2$—C(=O)—NH—C$_3$H$_7$ | M.P. 67° C. |
| (6) | C$_2$H$_5$O, iC$_3$H$_7$—NH — P(=S)—S—CH$_2$—C(=O)—NH—C$_3$H$_7$ | $n_D^{22}$ 1.5251 |

TABLE—Continued

| | Constitution | Physical properties |
|---|---|---|
| (9) | 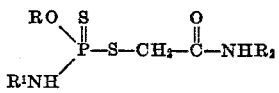 | $n_D^{23}$ 1.5397. |
| (11) | 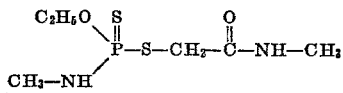 | $n_D^{24}$ 1.5551. |
| (12) | 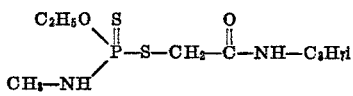 | $n_D^{23.5}$ 1.5468. |

It will be appreciated that the instant specification and examples are set forth by way of illustration and not limitation, and that various modifications and changes may be made without departing from the spirit and scope of the present invention.

What is claimed is:

1. Thionothiolphosphoric acid ester amides of the general formula:

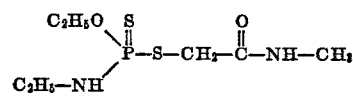

in which
R and $R^2$ each is an alkyl or alkenyl radical with up to 6 carbon atoms, and
$R^1$ is a methyl, ethyl, isopropyl or an alkenyl radical with up to 4 carbon atoms.

2. Compounds according to claim 1 in which R and $R^2$ each is an alkyl radical with up to 4 carbon atoms or allyl, and $R^1$ is methyl, ethyl, isopropyl or allyl.

3. Compound according to claim 1 wherein such compound is O-ethyl-N-monomethyl-S-[N'-methyl-carbamylmethyl]thionothiolphosphoric acid ester amide of the formula:

$$\begin{array}{c} C_2H_5O \\ \phantom{C_2H_5}\diagdown \\ CH_3-NH \end{array} \!\!\!\! P\!\!-\!\!S\!\!-\!\!CH_2\!\!-\!\!C\!\!-\!\!NH\!\!-\!\!CH_3$$

4. Compound according to claim 1 wherein such compound is O-ethyl-N-monomethyl-S-[N'-isopropyl-carbamylmethyl]thionothiolphosphoric acid ester amide of the formula:

$$\begin{array}{c} C_2H_5O \\ \phantom{C_2H_5}\diagdown \\ CH_3-NH \end{array} \!\!\!\! P\!\!-\!\!S\!\!-\!\!CH_2\!\!-\!\!C\!\!-\!\!NH\!\!-\!\!C_3H_7\text{-}i$$

5. Compound according to claim 1 wherein such compound is O-ethyl-N-monoethyl-S-[N'-methyl-carbamylmethyl] thionothiolphosphoric acid ester amide of the formula:

$$\begin{array}{c} C_2H_5O \\ \phantom{C_2H_5}\diagdown \\ C_2H_5-NH \end{array} \!\!\!\! P\!\!-\!\!S\!\!-\!\!CH_2\!\!-\!\!C\!\!-\!\!NH\!\!-\!\!CH_3$$

6. Compound according to claim 1 wherein such compound is O-methyl-N-monoisopropyl-S-[N'-methyl-carbamylmethyl]thionothiolphosphoric acid ester amide of the formula:

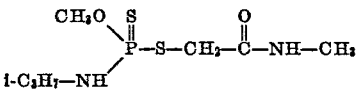

7. Compound according to claim 1 wherein such compound is O-ethyl-N-monoisopropyl-S-[N'-methyl-carbamylmethyl]thionothiolphosphoric acid ester amide of the formula:

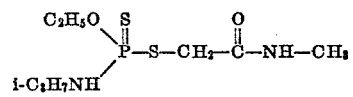

8. Compound according to claim 1 wherein such compound is O-ethyl-N-monoisopropyl-S-[N'-isopropyl-carbamylmethyl]thionothiolphosphoric acid ester amide of the formula:

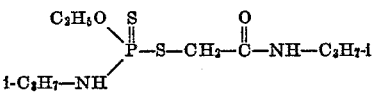

9. Compound according to claim 1 wherein such compound is O-n-propyl-N-monoisopropyl-S-[N'-methyl-carbamylmethyl]thionothiolphosphoric acid ester amide of the formula:

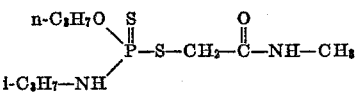

References Cited
FOREIGN PATENTS

| 183,205 | 8/1966 | Russia | 260—943 |
| 15,800 | 1969 | Japan | 260—943 |

LEWIS GOTTS, Primary Examiner

R. L. RAYMOND, Assistant Examiner

U.S. Cl. X.R.

260—979; 424—212

UNITED STATES PATENT OFFICE
CERTIFICATE OF CORRECTION

Patent No. 3,787,535  Dated January 22, 1974

Inventor(s) Claus Stolzer et al

It is certified that error appears in the above-identified patent and that said Letters Patent are hereby corrected as shown below:

Col. 4, line 48, correct spelling of "germanica".

Col. 7, Table 1, Compound (A), change "$\overset{N}{\underset{C}{\|}}$" to -- $\overset{O}{\underset{C}{\|}}$ --.

Col. 8, Table 2, Compound (C), under heading "Degree of destruction in percent after 4 days" change "1.0" to -- 100 --.

Signed and sealed this 27th day of August 1974.

(SEAL)
Attest:

McCOY M. GIBSON, JR.
Attesting Officer

C. MARSHALL DANN
Commissioner of Patents